US008712849B2

(12) United States Patent
Haikara et al.

(10) Patent No.: US 8,712,849 B2
(45) Date of Patent: Apr. 29, 2014

(54) SYSTEM AND METHOD FOR PROVIDING ADVERTISING CONTENT USING A GROUP TRAINING SYSTEM

(75) Inventors: Jukka Haikara, Oulu (FI); Mika Erkkila, Oulu (FI)

(73) Assignee: Polar Electro Oy, Kempele (FI)

( * ) Notice: Subject to any disclaimer, the term of this patent is extended or adjusted under 35 U.S.C. 154(b) by 1021 days.

(21) Appl. No.: 12/551,009

(22) Filed: Aug. 31, 2009

(65) Prior Publication Data

US 2011/0055020 A1    Mar. 3, 2011

(51) Int. Cl.
*G06Q 40/00*    (2012.01)

(52) U.S. Cl.
USPC .................................. 705/14.69; 705/14.42

(58) Field of Classification Search
USPC ........................................................... 705/14
See application file for complete search history.

(56) References Cited

U.S. PATENT DOCUMENTS

| | | | | |
|---|---|---|---|---|
| 6,971,973 | B2 * | 12/2005 | Cohen et al. | 482/8 |
| 2008/0319855 | A1 * | 12/2008 | Stivoric et al. | 705/14 |
| 2009/0132373 | A1 * | 5/2009 | Redlich | 705/14 |

OTHER PUBLICATIONS

Computational Probability and Statistics Grenander, Ulf. SIAM Review 15.1 (Jan. 1973): 59.*

Education and Training for Computer-Based Reference Services: A Case Study Robinson, Jo. Journal of the American Society for Information Science (pre-1986) 31.2 (Mar. 1980): 97.*

A Computer Intermediary for Interactive Database Searching. II. Evaluation Meadow, Charles T; Hewett, Thomas T; Aversa, Elizabeth S. Journal of the American Society for Information Science (pre-1986) 33.6 (Nov. 1982): 357.*

* cited by examiner

*Primary Examiner* — Hani M Kazimi
*Assistant Examiner* — Hatem M Ali
(74) *Attorney, Agent, or Firm* — Hoffmann & Baron, LLP (57) ABSTRACT

A method of providing advertising content using a group training system (GTS) includes transferring first advertising content from an advertiser system (AS) to a first GTS by an advertising content service provider system (ACSPS), transferring payment from the AS by the ACSPS as compensation for the first advertising content being displayed on a multi-user display associated with the first GTS, and transferring payment from the ACSPS to an entity associated with the first GTS as compensation for the first advertising content being displayed on the multi-user display associated with the first GTS. An advertising content service provider system (ACSPS) includes a processing device and a memory device. The processing device transfers first advertising content from an advertiser system (AS) to a first GTS for display on a multi-user display associated with the first GTS, payment is transferred by the processing device from the AS as compensation for the first advertising content being displayed on the multi-user display associated with the first GTS, and payment is transferred by the processing device to an entity associated with the first GTS as compensation for the first advertising content being displayed on the multi-user display associated with the first GTS. A computer-readable storage medium includes instructions in accordance with the disclosed method.

21 Claims, 11 Drawing Sheets

SYSTEM AND METHOD FOR PROVIDING ADVERTISING CONTENT USING A GROUP TRAINING SYSTEM

BACKGROUND

1. Field

The disclosure relates to the distribution of advertising content, and more specifically to displaying advertising content using a group training system.

2. Description of the Related Art

Advertisers are constantly challenged to find new ways to present advertising content such that the intended recipients are most likely to view, understand, and respond to the advertising content. At the same time, most advertising recipients are unable or unwilling to divert their attention to what they may view as bothersome advertisements.

Therefore, it would be highly beneficial if advertising content were to be provided to potential recipients under conditions in which the intended recipients have chosen to be a captive audience without the multitude of external distractions that normally compete for their attention. It would also be beneficial if a corresponding flow of revenue could be developed that could finance the provision of advertising content in this way, thereby ensuring a continuous flow of relevant content.

SUMMARY

In a first aspect, there is provided a method of providing advertising content using a group training system (GTS), which includes transferring first advertising content from an advertiser system (AS) to a first GTS by an advertising content service provider system (ACSPS), transferring payment from the AS by the ACSPS as compensation for the first advertising content being displayed on a multi-user display associated with the first GTS, and transferring payment from the ACSPS to an entity associated with the first GTS as compensation for the first advertising content being displayed on the multi-user display associated with the first GTS.

The payment transferred to the entity associated with the first GTS may represent a portion of the payment transferred from the AS, and the multi-user display may include a multi-user grid display that displays heart rate information associated with a plurality of participants in an exercise session. The entity associated with the first GTS may include a business entity, at least one person, an association, a lessee of the first GTS, and/or an owner of the first GTS.

The method may also include providing a report from the ACSPS to the AS, and the report may include an invoice requesting payment from the AS as compensation for the first advertising content being displayed on the multi-user display of the first GTS, an identification of the first advertising content displayed on the multi-user display associated with the first GTS, a duration of time that the first advertising content was displayed on the multi-user display associated with the first GTS, and/or search word information. The method may also include providing a report from the ACSPS to the entity associated with the first GTS, and the report may include an identification of the first advertising content displayed on the multi-user display associated with the first GTS, a duration of time that the first advertising content was displayed on the multi-user display associated with the first GTS, and/or an amount to paid to the entity associated with the first GTS as compensation for displaying the first advertising content on the first multi-user display associated with the first GTS. The method may also include transferring second advertising content from an entity associated with the first GTS to a second GTS by the ACSPS, transferring payment from the entity associated with the first GTS by the ACSPS as compensation for the second advertising content being displayed on the multi-user display associated with the second GTS, and/or transferring payment from the ACSPS to an entity associated with the second GTS as compensation for the second advertising content being displayed on the multi-user display associated with the second GTS.

In a second aspect, there is provided an advertising content service provider system (ACSPS) that provides advertising content using a group training system (GTS), which includes a processing device and at least one memory device operatively coupled to the processing device. The processing device transfers first advertising content from an advertiser system (AS) to a first GTS for display on a multi-user display associated with the first GTS, payment being transferred by the processing device from the AS as compensation for the first advertising content being displayed on the multi-user display associated with the first GTS, payment being transferred by the processing device to an entity associated with the first GTS as compensation for the first advertising content being displayed on the multi-user display associated with the first GTS.

The payment transferred to the entity associated with the first GTS may represent a portion of the payment transferred from the AS, and the multi-user display may include a multi-user grid display that displays heart rate information associated with a plurality of participants in an exercise session. The entity associated with the first GTS may include a business entity, at least one person, an association, a lessee of the first GTS, and/or an owner of the first GTS.

The processing device may provide a report to the AS, which can include an invoice requesting the payment from the AS as compensation for the first advertising content being displayed on the multi-user display associated with the first GTS, an identification of the first advertising content displayed on the multi-user display associated with the first GTS, a duration of time that the first advertising content was displayed on the multi-user display associated with the first GTS, and/or search word information. The processing device may provide a report to the entity associated with the first GTS, which includes an identification of the first advertising content displayed on the multi-user display associated with the first GTS, a duration of time that the first advertising content was displayed on the multi-user display associated with the first GTS, and/or an amount to paid to the entity associated with the first GTS as compensation for displaying the first advertising content on the first multi-user display associated with the first GTS. The processing device may transfer second advertising content from the entity associated with the first GTS for display on a multi-user display associated with a second GTS. The payment may be transferred by the processing device from the entity associated with the first GTS as compensation for the second advertising content being displayed on the multi-user display associated with the second GTS. The payment may be transferred by the processing device to an entity associated with the second GTS as compensation for the second advertising content being displayed on the multi-user display associated with the second GTS.

In another aspect, there is provided a computer-readable storage medium including instructions encoded thereon that, when executed by a processing device, cause the processing device to provide advertising content using a group training system (GTS) by transferring first advertising content from an advertiser system (AS) to a first GTS by an advertising content service provider system (ACSPS), transferring payment from the AS by the ACSPS as compensation for the first advertising content being displayed on a multi-user display associated with the first GTS, and transferring payment from the ACSPS to an entity associated with the first GTS as compensation for the first advertising content being displayed on the multi-user display associated with the first GTS.

The instructions causing the processing device to transfer payment to the entity associated with the first GTS may include instructions that, when executed by the processing device, cause the processing device to transfer a portion of the payment transferred from the AS to the entity associated with the first GTS, and the multi-user display may include a multi-user grid display that displays heart rate information associated with a plurality of participants in an exercise session. The entity associated with the first GTS may include a business entity, at least one person, an association, a lessee of the first GTS, and/or an owner of the first GTS.

The computer-readable storage medium may include instructions that, when executed by the processing device, cause the processing device to provide advertising content using a group training system (GTS) by providing a report from the ACSPS to the AS, and the report may include an invoice requesting the payment from the AS as compensation for the first advertising content being displayed on the multi-user display associated with the first GTS, an identification of the first advertising content displayed on the multi-user display associated with the first GTS, a duration of time that the first advertising content was displayed on the multi-user display associated with the first GTS, and/or search word information. The computer-readable storage medium may include instructions that, when executed by the processing device, cause the processing device to provide advertising content using a group training system (GTS) by providing a report from the ACSPS to the entity associated with the first GTS, and the report may include an identification of the first advertising content displayed on the multi-user display associated with the first GTS, a duration of time that the first advertising content was displayed on the multi-user display associated with the first GTS, and/or an amount to paid to the entity associated with the first GTS as compensation for displaying the first advertising content on the first multi-user display associated with the first GTS. The computer-readable storage medium may include further instructions that, when executed by the processing device, cause the processing device to provide advertising content using a group training system (GTS) by transferring second advertising content from the entity associated with the first GTS to a second GTS by the ACSPS, transferring payment from the entity associated with the first GTS by the ACSPS as compensation for the second advertising content being displayed on the multi-user display associated with the second GTS, and transferring payment from the ACSPS to an entity associated with the second GTS as compensation for the second advertising content being displayed on the multi-user display associated with the second GTS.

These and other purposes, goals, and advantages of the present application will become apparent from the following detailed description of exemplary embodiments read in connection with the accompanying drawings.

BRIEF DESCRIPTION OF THE DRAWINGS

In the following, the embodiments will be described in greater detail with reference to the accompanying drawings, in which.

DETAILED DESCRIPTION

Figure 1:
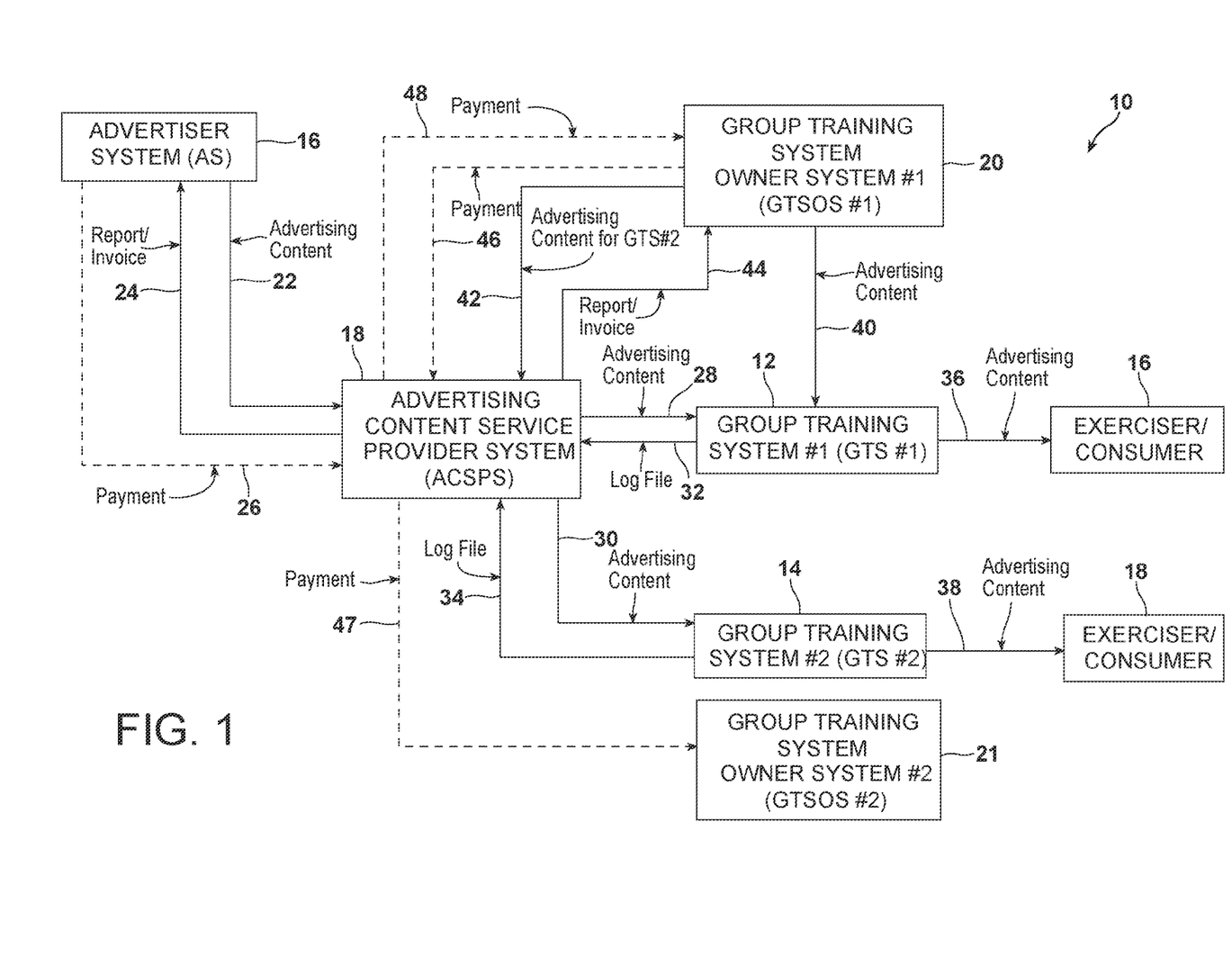
FIG. 1 is a block diagram of a system for providing advertising content using a group training system.

FIG. 1 is a block diagram of a system 10 that provides advertising content to exercisers/consumers using at least one group training system 12, 14. Advertising content is defined herein to include advertisements and ads in any format now known or hereafter developed. The system 10 includes an advertiser system (AS) 16, an advertising content service provider system (ACSPS) 18, at least one group training system owner system (GTSOS #1) 20, (GTSOS #2) 21, and at least one group training system (GTS #1) 12, (GTS #2) 14. The GTSOS elements are intended to refer to a system or entity associated with the corresponding GTS such as, but not limited to a business entity (such as a corporation, partnership, or association), at least one person, and/or an owner or lessee of the corresponding GTS.

The AS 16 provides advertising content 22 to the ACSPS 18, and the ACSPS 18 provides a periodic report and/or invoice 24 to the AS 16 associated with the display of this advertising content 22. The periodic report/invoice 24 can include the total amount of advertising content from AS 16 that is shown by GTS #1 12 and/or GTS #2 14 in, for example, fitness clubs; the duration of time that the advertising content is shown by GTS #1 12 and/or GTS #2 14; the total payment to be charged as compensation for showing the advertising content; detailed information concerning the advertising content; an identification of the advertising content from AS 16 that is shown by GTS #1 12 and/or GTS #2 14; and/or detailed information regarding search word matches used to access the advertising content on GTS #1 12 or GTS #2 14. The AS 16 then provides payment 26 to the ACSPS 18 in accordance with, as compensation for, or as required by the report/invoice 24.

The ACSPS 18 provides advertising content 28, 30 for display by GTS #1 12 and/or GTS #2 14, respectively, and GTS #1 12 and GTS #2 14 periodically provide log files 32, 34, respectively, to the ACSPS 18, which include information concerning the advertising content 36, 38 downloaded and displayed to the exercisers/consumers 16, 18.

Advertising content 40 can be directly provided by GTSOS #1 20 to GTS #1 12. GTSOS #1 20 can also provide advertising content 42 to be downloaded and displayed by GTS #1 12 and/or GTS #2 14 via ACSPS 18. A periodic report and/or invoice 44 is provided by the ACSPS 18 to GTSOS #1 20, which can include an identification of the advertising content from AS 16 that is shown by GTS #1 12 and/or GTS #2 14; a total amount of advertising content from GTSOS #1 20 that is shown by GTS #1 12 and/or GTS #2 14; the duration of the advertising content shown; and the total amount to be paid by GTSOS #1 20 as compensation for the display of the advertising content 42 using, for example, an electronic fund transfer. Payment 46 is provided by GTSOS #1 20 to the ACSPS 18 in accordance with, as required by the report/invoice 44, or as compensation for the display of advertising content 42 on GTS #1 12 and/or GTS #2 14. Payment 48 is provided from the ACSPS 18 to GTSOS #1 20 as a portion of the payment 26 received from the AS 16 as compensation for the display of advertising content 22 by GTS #1, 12 and/or GTS #2 14. Payment 47 is provided by the ACSPS 18 to the GTSOS #2 21 as a portion of the payment 46 received from GTSOS #1 20 as compensation for the display of advertising content 42 by GTS #2 14.

Figure 2A:
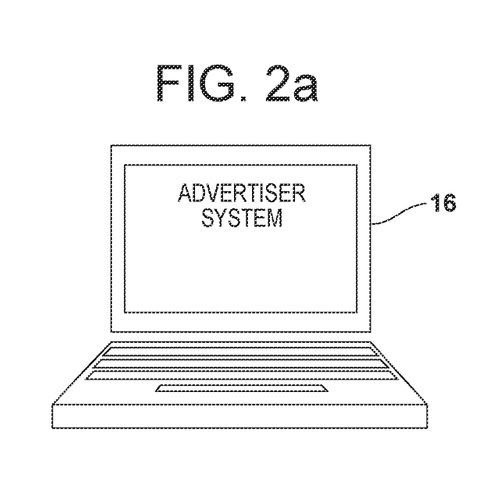
FIGS. 2a-c show examples of an advertiser system, an advertising content service provider system, and a group training system owner system, respectively.
Figure 2B:
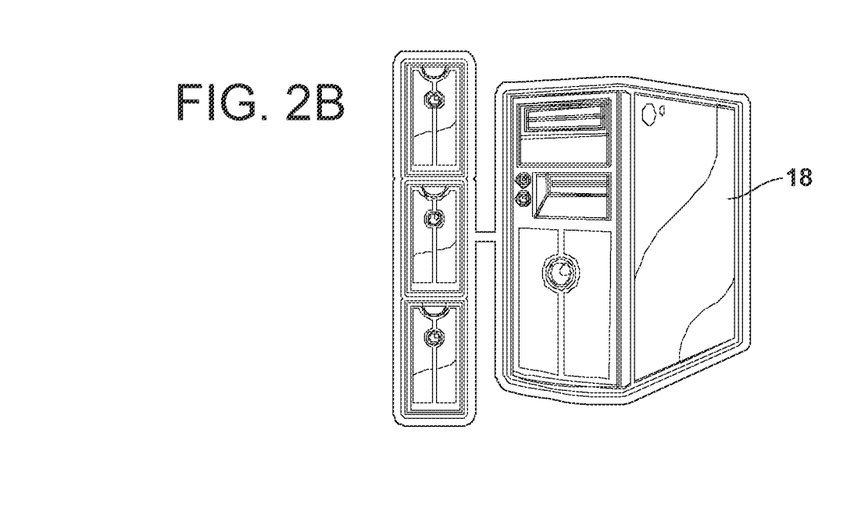
Figure 2C:
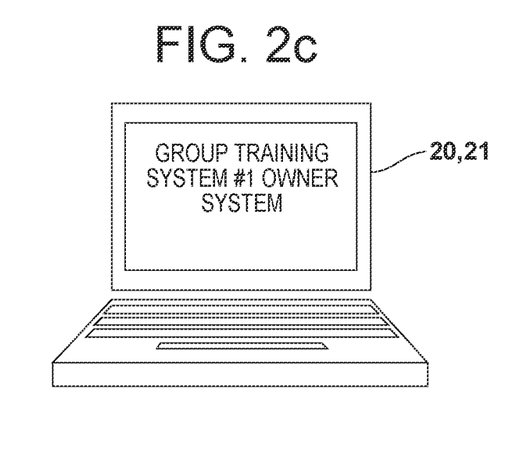

FIGS. 2a-c provide exemplary implementations of the AS 16, ACSPS 18, GTSOS #1 20, and GTSOS #2 21, respectively, which can include a personal computer, server, network access device, and the like. Each of these implementations may include a processing device and at least one memory device operatively coupled thereto.

Figure 3:
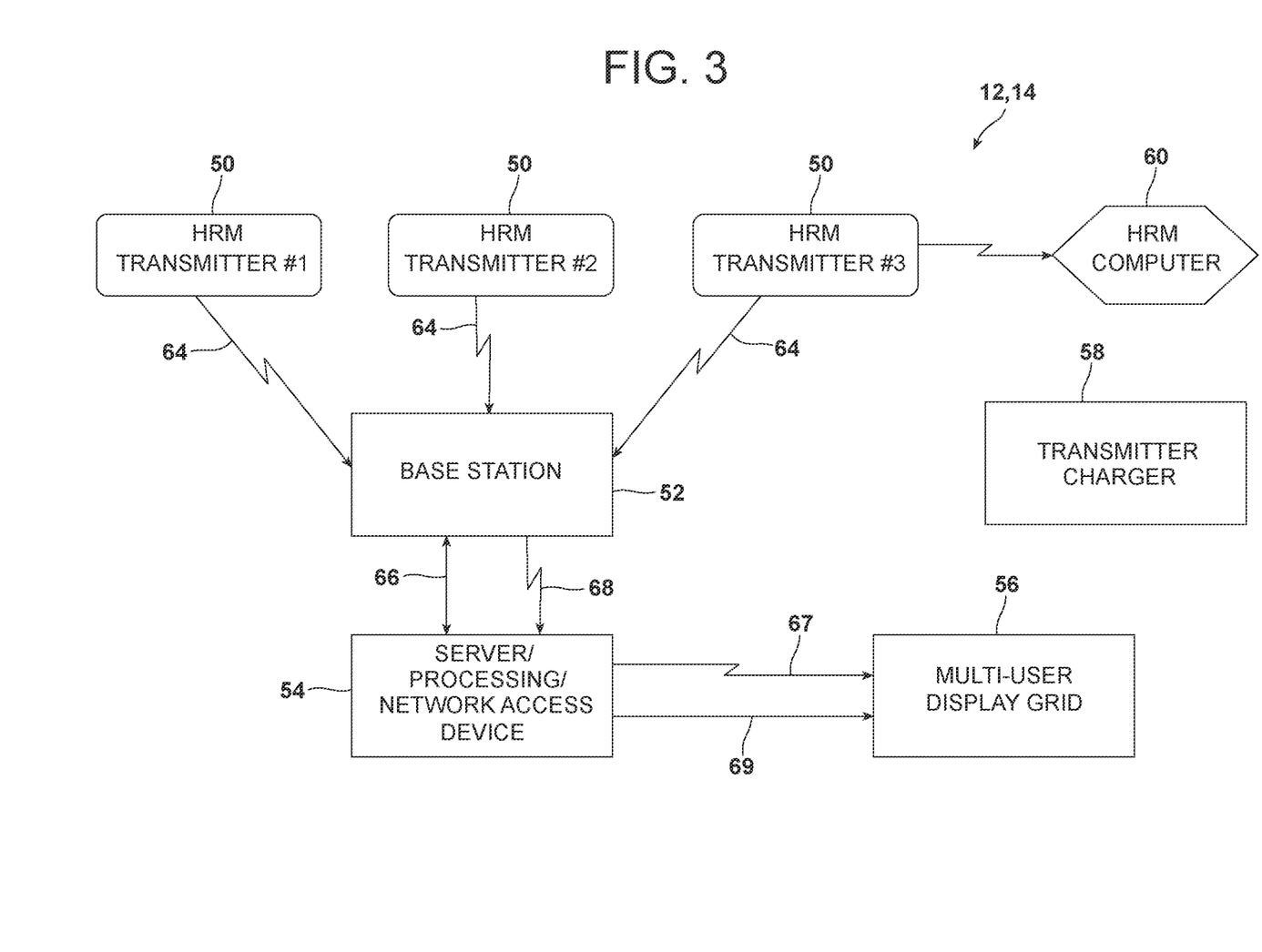
FIG. 3 is a block diagram of an example of the group training system.
Figure 4:
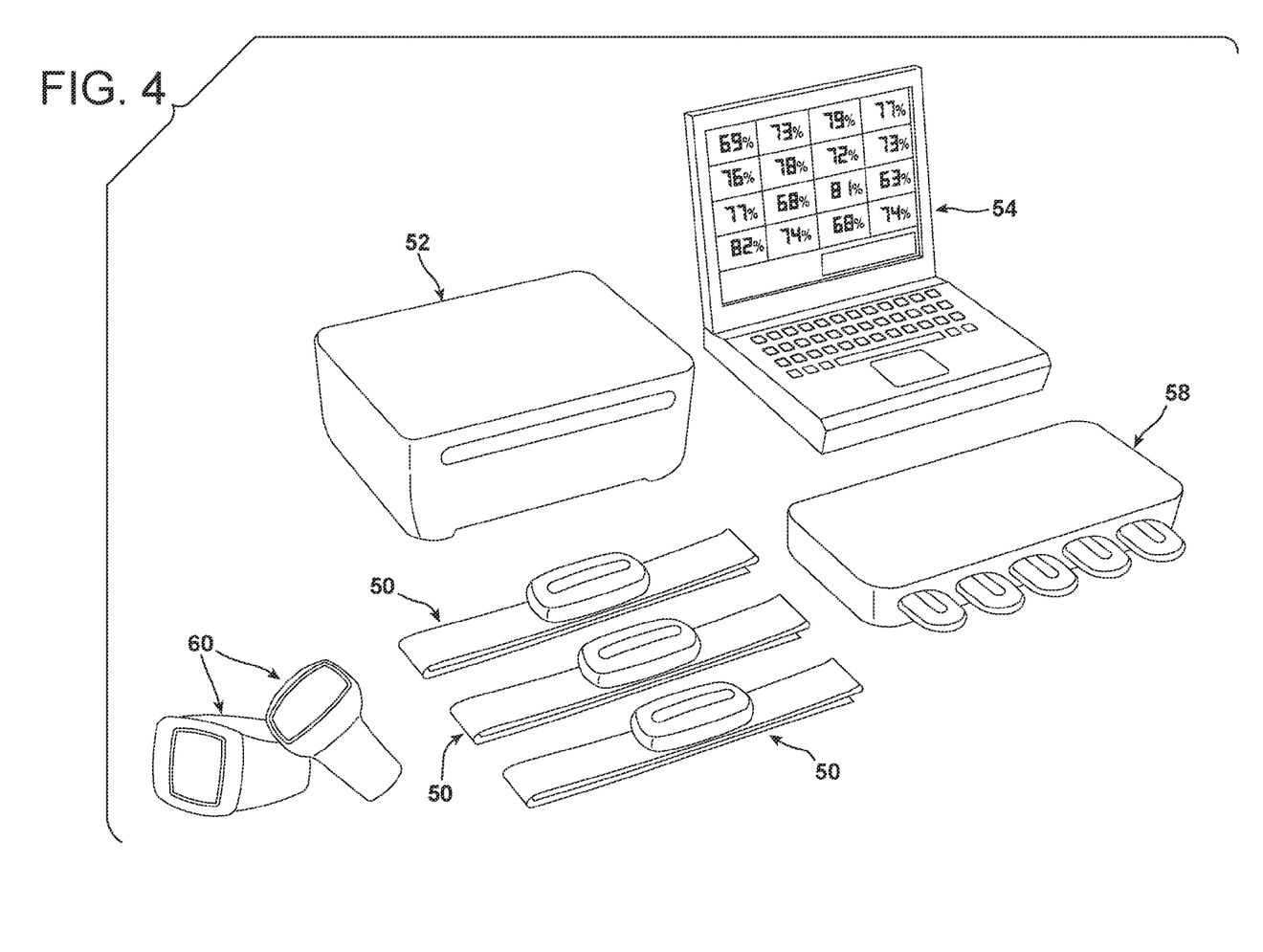
FIG. 4 is a pictorial view of components in the group training system shown in FIG. 3.

FIG. 3 shows an example of the group training systems 12, 14, which include heart rate monitor transmitters 50, a base station 52, a processing device, server, or network access device 54, a multi-user grid display 56, and a transmitter charger 58. Pictorial views of the components in the group training systems 12, 14 are shown in FIG. 4.

Figure 5:
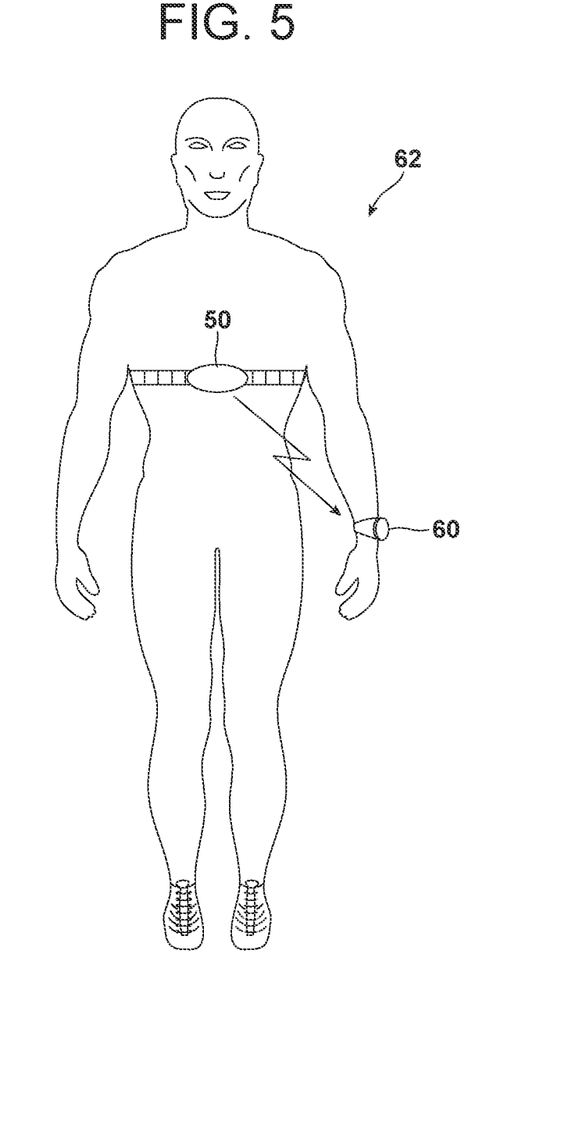
FIG. 5 shows a heart rate monitor and heart rate computer used in the group training system shown in FIGS. 3 and 4.

As shown in FIG. 5, a user 62 preferably wears one of the HRM transmitters 50 around the user's chest, and the HRM transmitter 50 saves and wirelessly transmits heart rate information to the base station 52. The heart rate information 64 can also be transmitted by wired or wireless means to a heart rate monitor computer 60 shown in FIGS. 3 and 5, which is typically worn on the user's wrist and provides an additional display and/or processing of the heart rate information. As shown in FIG. 3, the base station 52 receives the heart rate information from the HRM transmitters 50 and forwards this information by wired 66 or wireless 68 means to the processing device 54. The base station 52 preferably connects to the HRM transmitters 50 through a secure, wireless, Bluetooth, real-time connection 64 that can connect up to a range of 100-150 meters. The transmitter charger 58 provides a convenient method of recharging the wireless HRM transmitters 50 that can be attached to the wall to charge a plurality of HRM transmitters 50 simultaneously. The processing device 54 provides for the ability to execute application software associated with the group training system, manage sessions and transmitters, enable session planning, enable exercise facility personnel to specify training zones, provide summaries of exercise sessions, and support a multilingual user and display interface.

Figure 7:
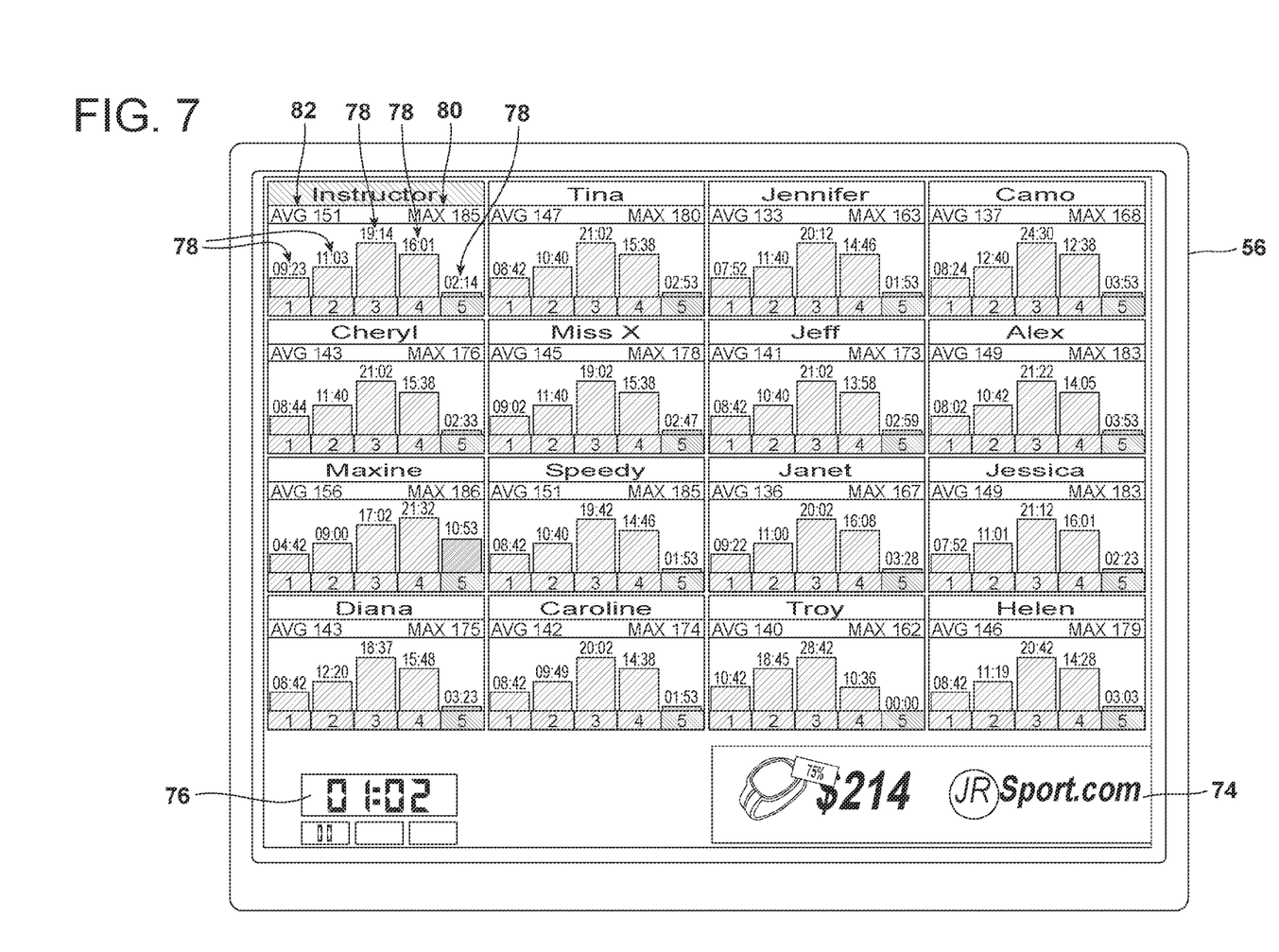
FIG. 7 is another screen view of the multi-user grid display shown in FIG. 6.

The group training systems 12, 14 are specifically designed for cardiovascular group training, such as, but not limited to, indoor cycling, circuit training, and aerobic classes. The group training systems 12, 14 enable the flow of an exercise session to be monitored and to generate enthusiasm for training in its participants. The participants and instructor can see the heart rates and training zones displayed on the multi-user grid display 56 and, after a training session, participants and the instructor are provided with a summary screen that includes the results of the training session on the grid display 56, as shown in FIG. 7. The processing device 54 is connected by wireless 67 and/or wired 69 means to the multi-user display 56.

The advantages of the group training system 12, 14 to the management of an exercise facility include increasing facility revenues, increasing customer loyalty, attracting new customers, providing a portable solution that is useable in different locations, enabling quality control of cardiovascular training sessions, and the ability to advertise on a large multi-user display screen.

The advantages of the group training system 12, 14 to personnel at an exercise facility include making the instructor's classes better by providing instantaneous feedback to exercise facility members to determine whether their planned targets have been met, enabling personal guidance of the exercise facility members by their instructors, and providing programmable heart rate zones and zone colors to more effectively visualize the achievement of training goals.

The advantages of the group training system 12, 14 to the members of the exercise facility include fast and easy registration and initialization of each participant and their corresponding HRM transmitter into the system, the ability to visualize heart rate and training zone guidance, the capability to interface with existing training computers that many of the members may already be using, and providing a comparison of the training intensity and heart rate parameters with other participants in an exercise session.

Before training, the instructor is able to create a specific exercise session tailored to each of the participants in the session. During training, the instructor is able to monitor and guide the participants so that each participant can best achieve their goals. After training, the instructor and members can analyze results of the training session. During a session creation phase, the instructor preferably creates an exercise session, selects target intensity zones, and selectively verifies communication between each of the HRM transmitters and the base station. During a participant registration phase of the exercise session, the registering participants are provided with an HRM transmitter in exchange for a deposit to ensure the return of the HRM transmitter. The member then moistens the electrode contact portion of the HRM transmitter such that the electrodes are given a conductive interface when strapped to the participant's chest. During a sign-up phase of the exercise session, the participants preferably select the number provided on his or her HRM transmitter and enter the participant's name and maximum heart rate or age. During an instructor setup phase, the instructor preferably selects the session type, enters the instructor's name and maximum heart rate or age, and confirms whether the instructor's heart rate should be included in the display.

Figure 6:
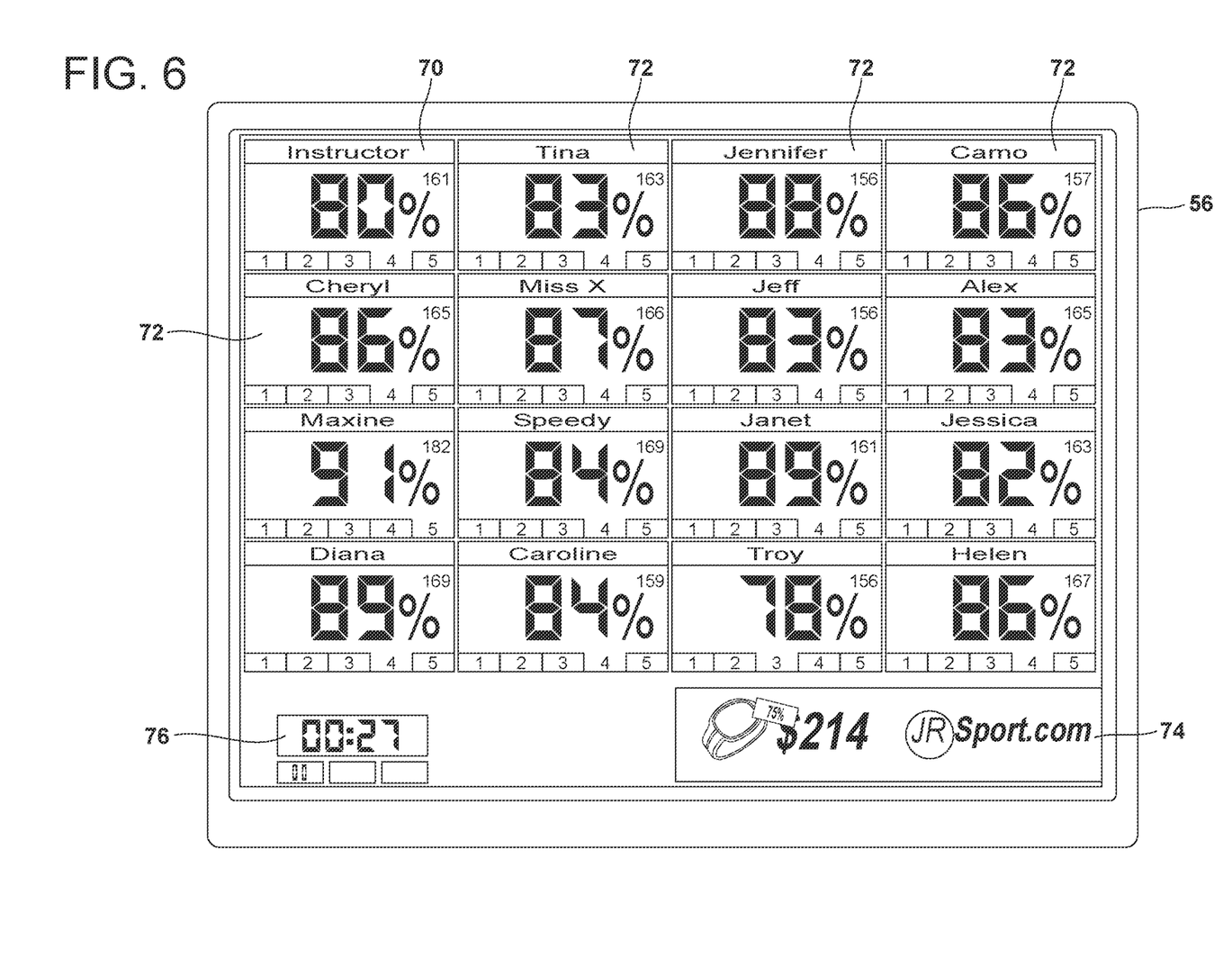
FIG. 6 is a screen view of a multi-user grid display used in the group training system shown in FIGS. 3 and 4.
Figure 8:
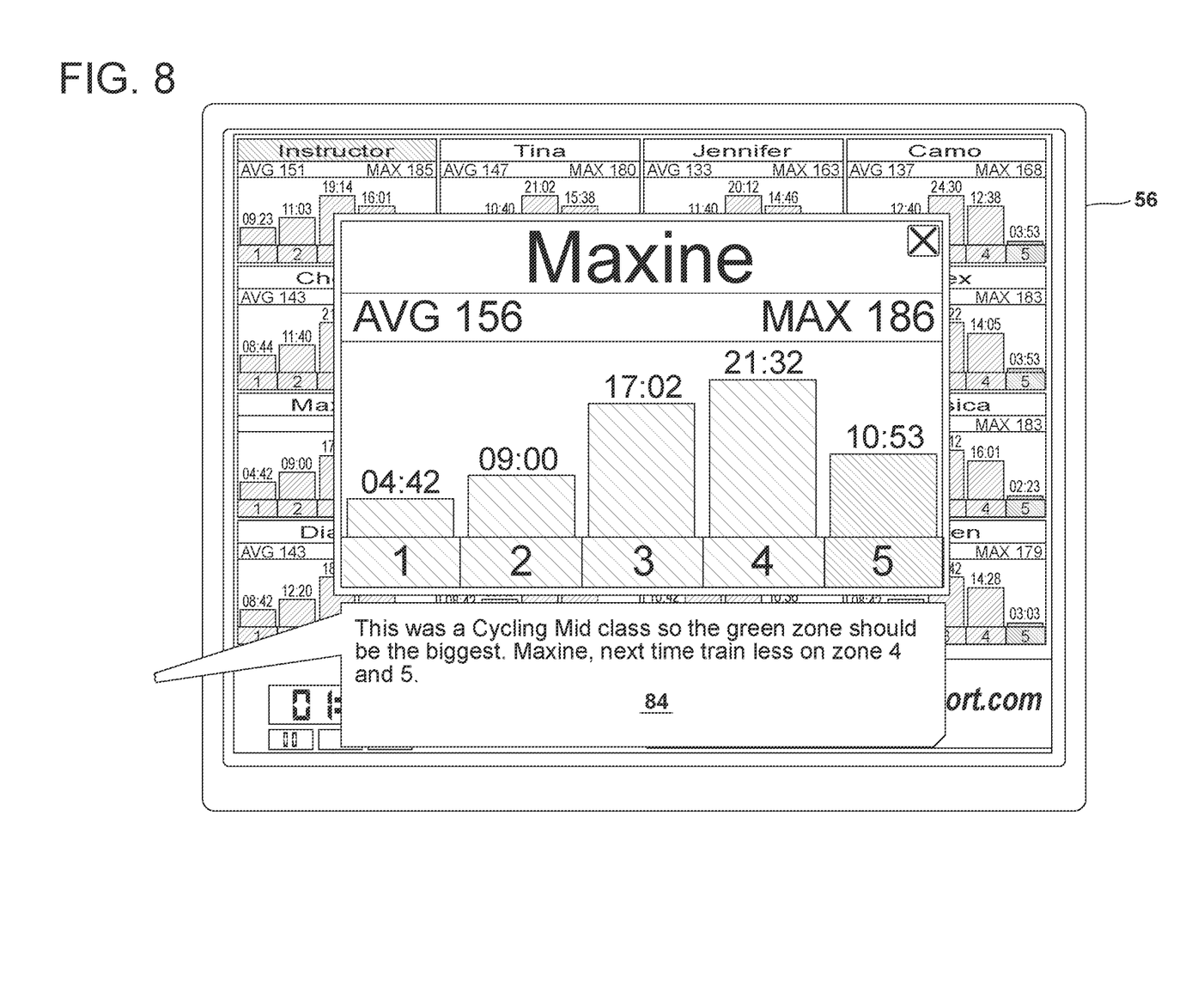
FIG. 8 is another screen view of the multi-user grid display shown in FIG. 6.

FIGS. 6-8 show various screen views of the multi-user grid display 56 shown in FIG. 3. In FIG. 6, the display 56 shows the grid divided into sixteen separate areas, which correspond to, for example, the instructor 70 and fifteen students 72 participating in an exercise session. Each of these sections provides information concerning one of the participants in the exercise session. For example, the section labeled "Tina" indicates that the student named "Tina" is currently operating at 83% of her maximum heart rate, which is 163 bpm and represents a fourth exercise zone. The background color of the sections 70, 72 indicate the training zone represented by the current heart rate. Additional areas on the display 56 include an advertisement banner 74, which displays the advertising content 22, 28, 30, 40, 42 referred to with respect to FIG. 1 to the participants of the exercise session, and a duration banner 76 that indicates the duration of the exercise session. The advertisement banner may include, for example, an Internet address or URL associated with the advertising content or advertiser, and a description or depiction of the product or services being advertised, as shown in FIGS. 6-7.

FIG. 7 shows a summary screen view of the display 56 that provides the amount of time 78 during the exercise session that each participant has spent in each of the five training zones, as well as a maximum heart rate 80, and an average heart rate 82 for each of the participants. The summary screen view makes it possible to determine whether the exercise session participants have met their intensity targets and enables the instructor to determine how classes can be improved in the future. The summary view can be saved in a session log.

FIG. 8 shows an enlarged view of that portion of the grid display 56 shown in FIG. 7 corresponding to the participant named "Maxine" with an analysis and recommendation banner 84 in textual form below the heart rate information.

Figure 9A:
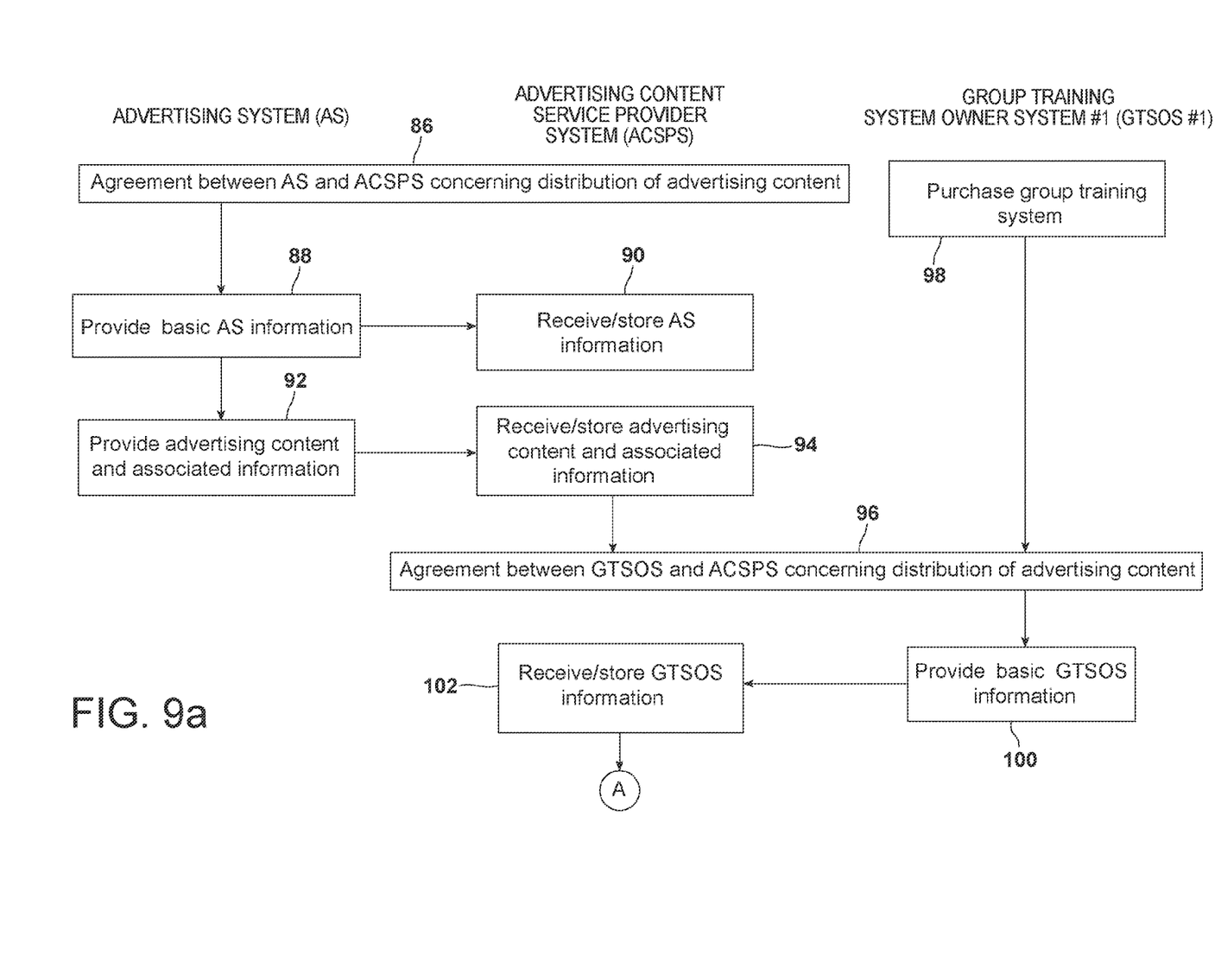
FIGS. 9a-c are relational flowcharts of a method for providing advertising content using the group training system.
Figure 9B:
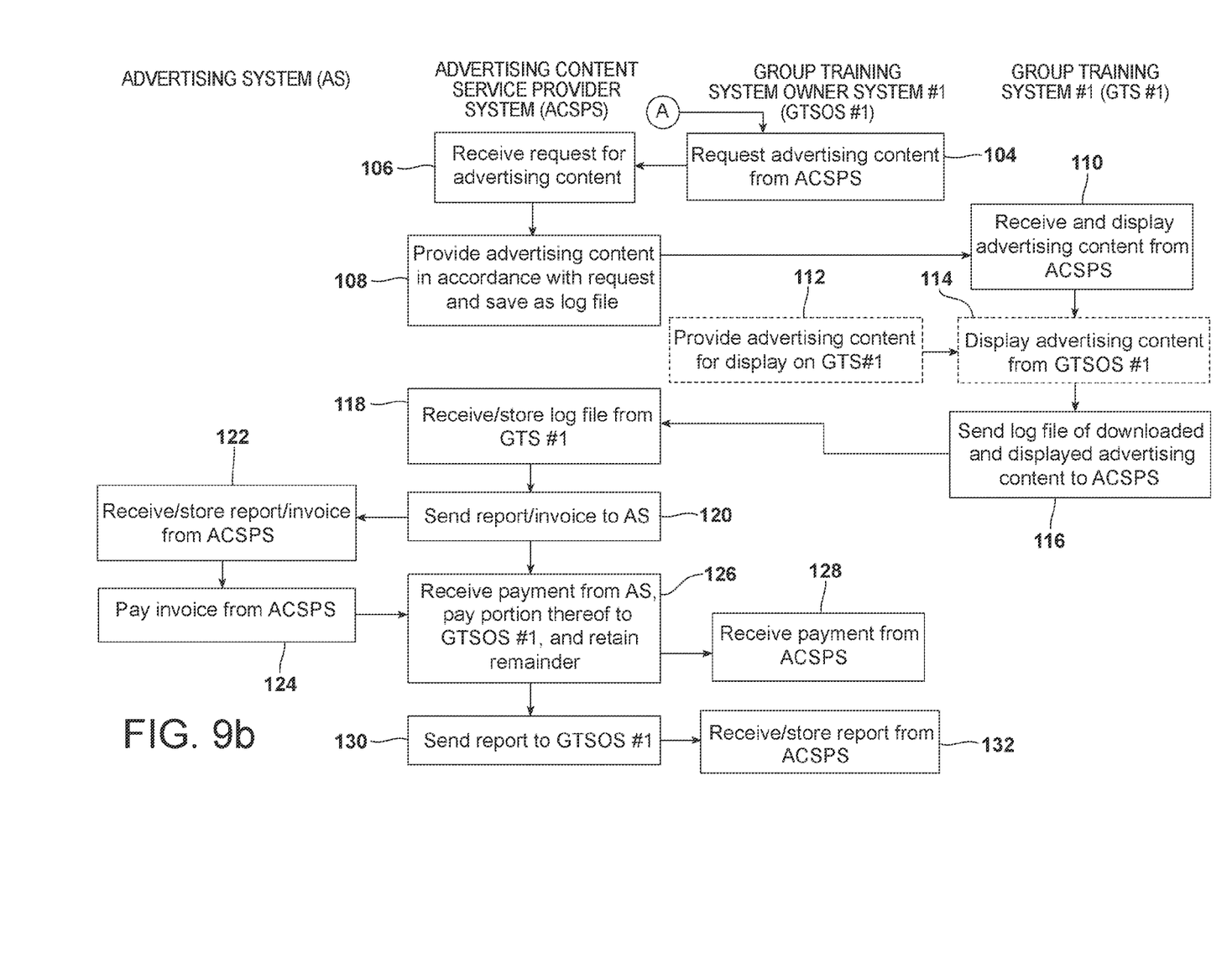
Figure 9C:
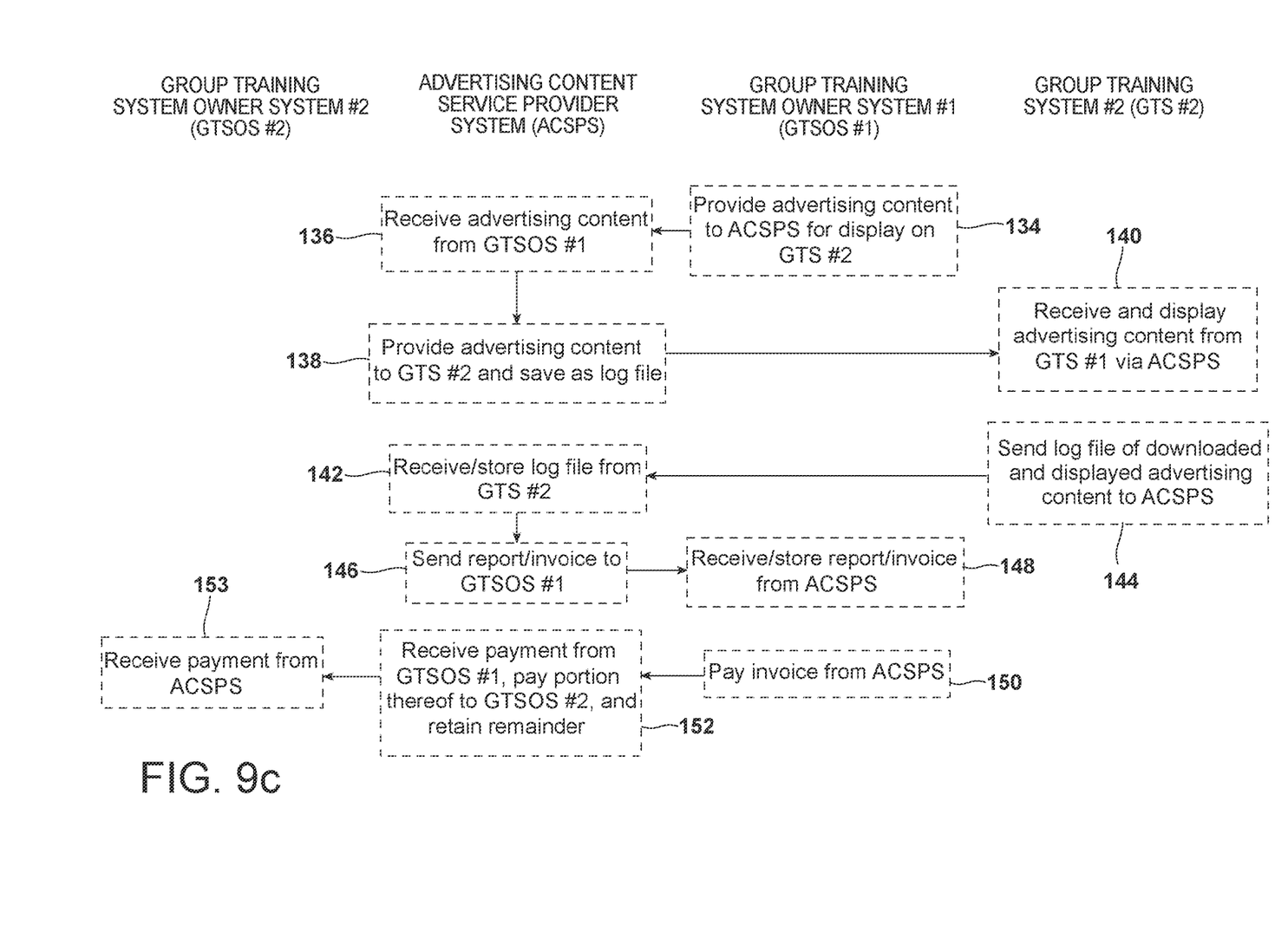

FIGS. 9*a-c* show a relational flowchart of a method for providing advertising content using the group training system. FIG. 9*a* shows the steps in initializing the method for providing advertising content using the group training system. In step 86, an agreement is made between the AS and ACSPS concerning the distribution of advertising content from the AS, and the AS provides basic AS information in step 88, which includes a customer area (such as the countries, states, regions, cities, and/or clubs where the advertising should be shown); a budget (which is the maximum quantity of displays per month, week, or day that the advertising content should be shown); and a payment method (which provides details concerning how the AS will pay for the display of advertising content). The AS information is received and stored by the ACSPS in step 90. The AS then uploads advertising content to the ACSPS as, for example, digital pictures or short video clips, in step 92 including associated information (such as, advertisement criteria; target audiences for each advertisement; a basic definition of the advertising content, company, product, or service to be advertised; an effective date range; an advertisement validity starting and ending date; and search words to aid in searching through the advertising content) which is received and stored by the ACSPS in step 94.

An agreement is made between the ACSPS and GTSOS #1 in step 96 regarding the distribution of advertising content to the GTS #1 purchased by the GTSOS #1 in step 98. Basic GTSOS information is provided by the GTSOS #1 to the ACSPS in step 100, such as a fitness club name with contact information; an address to be used as the advertisement customer area (which can be implemented through selection of a country or countries, state(s), and/or zip code(s)); and a payback method for GTSOS #1 payments, which is received and stored by the ACSPS in step 102.

The method then proceeds to step 104 shown in FIG. 9*b*, in which GTSOS #1 requests advertising content from the ACSPS, which receives the request in step 106. The GTSOS #1 selects the advertisements for all training sessions and specific advertisements for selected exercise sessions from the ACSPS based on a date range, companies, products, and search words. For example, the GTSOS can select the date of the training session and the ACSPS can show the advertising content that is valid during the selected date. The GTSOS can also select favored companies, the advertising from which can be shown, and non-favored companies, the advertising content of which cannot be shown. This selection can be based on ad agreements. The GTSOS can also search for advertising associated with a specific content, such as indoor cycling, based on keywords, such as "indoor cycling", "cycling shoes", "cycling shoes", and "spinning". The ACSPS provides the advertising content to the GTS #1 in accordance with the request and saves the advertising content provided as a log file in step 108. The advertising content is received and displayed by the GTS #1 in step 110. The GTSOS #1 may optionally provide advertising content for direct display on the GTS #1 in step 112, which is displayed by the GTS #1 in step 114 without intervention by the ACSPS. The GTSOS #1 can provide its own advertisements that are not circulated by the ACSPS (shown as advertising content 40 in FIG. 1) such as advertisements about new training sessions or club events, which can be shown during training sessions.

A log file of downloaded and displayed advertising content is sent by the GTS #1 to the ACSPS in step 116, which is received and stored by the ACSPS in step 118. The report/invoice is sent by the ACSPS to the AS in step 120, which is received and stored by the AS in step 122. The report/invoice sent by the ACSPS can include the total amount and duration of advertising content shown by the GTS, the total payment to be charged to the AS, detailed information regarding the advertising content, and detailed information regarding search word matches.

The invoice is paid by the AS to the ACSPS in step 124, and the ACSPS receives the payment, pays a portion thereof to the GTSOS #1, and retains the remainder in step 126. The payment from the ACSPS is received by the GTSOS #1 in step 128, and a report is sent by the ACSPS to the GTSOS #1 in step 130, which is received and stored by the GTSOS #1 in step 132. The ACSPS report in step 130 can include the total quantity and duration of advertising content shown by the GTS and the total payback amount received from the AS.

FIG. 9C shows a relational flow chart of additional paths for advertising content to flow from the GTSOS #1 to another group training system GTS #2. Advertising content is provided to the ACSPS from the GTSOS #1 in step 134, and received by the ACSPS in step 136. This advertising content is provided by the ACSPS to the GTS #2 and is saved as a log file in the ACSPS in step 138. The advertising content is received and displayed by the GTS #2 in step 140, and a log file of the downloaded and displayed advertising content is sent to the ACSPS by GTS #2 in step 144. The log file is received and stored by the ACSPS in step 142, and a report/invoice is sent by the ACSPS in step 146, which is received and stored by the GTSOS #1 in step 148. The invoice concerning the advertising content displayed by the GTS #2 is paid by the GTSOS #1 in step 150, which is received by the ACSPS in step 150. A portion of this payment is paid to and received by the GTSOS #2 in step 153, and the remainder is retained by the ACSPS.

The GTSOS #1 may alternatively be merged and/or associated with one or more group training systems GTS #1 and/or GTS #2 while remaining within the scope of the present invention and may be implemented in the same or separate devices.

The method shown in FIGS. 9*a-c* may be encoded as instructions on a computer-readable medium, which although referred to as a single medium, the term "computer-readable medium" is intended to include a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, example embodiment, the computer-readable medium can include a solid-state memory, such as a memory card or other package, which houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals, such as a signal communicated over a transmission medium. A digital file attachment to an e-mail or other self-contained information archive or set of archives may be considered a distribution medium that is equivalent to a tangible storage medium. Accordingly, any one or more of a computer-readable medium or a distribution medium and other equivalents and successor media, in which data or instructions may be stored, are included herein.

In accordance with various embodiments, the methods described herein may be implemented as one or more software programs running on a computer processor or processing device. Dedicated hardware implementations including, but not limited to, application specific integrated circuits, programmable logic arrays, microprocessor, microcontrollers, and other hardware devices can likewise be constructed to implement the methods described herein. Further, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, a tangible storage medium or distribution medium as listed herein and other equivalents and successor media, in which the software implementations herein may be stored, are included herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

Computer program elements described above may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part of all of the invention could be implemented in a distributed manner, e.g., over a network such as the Internet.

The embodiments disclosed herein can also be embedded in a computer program product, which comprises all the features enabling the implementation of the methods and functions described herein, and which when loaded in a computer system is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

What is claimed is:

1. A method of providing advertising content using a group training system (GTS), the method comprising:
transferring, using a processing device, first advertising content to a first GTS by an advertising content service provider system (ACSPS), the first advertising content being provided by an advertiser system (AS);
transferring, using the processing device, payment from the AS by the ACSPS as compensation for the first advertising content being displayed on a multi-user display;
displaying in a grid-like format on the multi-user display, real-time training-related information associated with each of a plurality of identified participants in a live cardiovascular group training session to the plurality of identified participants, thereby enabling comparison of the real-time training-related information by the plurality of identified participants during and after the live cardiovascular group training session, the multi-user display being associated with the first GTS;
analyzing, using the processing device, the real-time training-related information associated with each of the plurality of identified participants in the live cardiovascular group training session, and generating a recommendation banner to the multi-user display for one or more identified participants in the live cardiovascular group training session; and
transferring, using the processing device, payment from the ACSPS to an entity associated with the first GTS as compensation for the first advertising content being displayed as an advertisement banner on the multi-user display associated with the first GTS.

2. The method of providing advertising content using the group training system (GTS) defined by claim 1, wherein the payment transferred to the entity associated with the first GTS represents a portion of the payment transferred from the AS.

3. The method of providing advertising content using the group training system (GTS) defined by claim 1, wherein the multi-user display comprises a multi-user grid display that displays heart rate information associated with a plurality of participants in an exercise session.

4. The method of providing advertising content using the group training system (GTS) defined by claim 1, wherein the entity associated with the first GTS comprises at least one of a business entity, at least one person, an association, a lessee of the first GTS, and an owner of the first GTS.

5. The method of providing advertising content using the group training system (GTS) defined by claim 1, further comprising:
providing a report from the ACSPS to the AS, the report comprising at least one of:
an invoice requesting the payment from the AS as compensation for the first advertising content being displayed on the multi-user display of the first GTS;
an identification of the first advertising content displayed on the multi-user display associated with the first GTS;
a duration of time that the first advertising content was displayed on the multi-user display associated with the first GTS; and
search word information.

6. The method of providing advertising content using the group training system (GTS) defined by claim 1, further comprising providing a report from the ACSPS to the entity associated with the first GTS, the report comprising at least one of:
an identification of the first advertising content displayed on the multi-user display associated with the first GTS;
a duration of time that the first advertising content was displayed on the multi-user display associated with the first GTS; and
an amount to be paid to the entity associated with the first GTS as compensation for displaying the first advertising content on the first multi-user display associated with the first GTS.

7. The method of providing advertising content using the group training system (GTS) defined by claim 1, further comprising:
transferring second advertising content to a second GTS by the ACSPS, the second advertising content being provided by the entity associated with the first GTS;
transferring payment from the entity associated with the first GTS by the ACSPS as compensation for the second advertising content being displayed on the multi-user display associated with the second GTS; and
transferring payment from the ACSPS to an entity associated with the second GTS as compensation for the second advertising content being displayed on the multi-user display associated with the second GTS.

8. An advertising content service provider system (ACSPS) that provides advertising content using a group training system (GTS), the ACSPS comprising:
a processing device; and
at least one memory device operatively coupled to the processing device, the processing device transferring first advertising content from an advertiser system (AS) to a first GTS for display in a grid-like format on a multi-user display that displays real-time training-related information associated with each of a plurality of identified participants in a live cardiovascular group training session to the plurality of identified participants, thereby enabling comparison of the real-time training-related information by the plurality of identified participants during and after the live cardiovascular group training session, the multi-user display being associated with the first GTS, the processing device analyzing the real-time training-related information associated with each of the plurality of identified participants in the live cardiovascular group training session, the processing device generating a recommendation banner to the multi-user display for one or more identified participants in the live cardiovascular group training session, payment being transferred by the processing device from the AS as compensation for the first advertising content being displayed as an advertisement banner on the multi-user display associated with the first GTS, and payment being transferred by the processing device to an entity associated with the first GTS as compensation for the first advertising content being displayed as an advertisement banner on the multi-user display associated with the first GTS.

9. The advertising content service provider system (ACSPS) that provides advertising content using the group training system (GTS) defined by claim 8, wherein the payment transferred to the entity associated with the first GTS represents a portion of the payment transferred from the AS.

10. The advertising content service provider system (ACSPS) that provides advertising content using the group training system (GTS) defined by claim 8, wherein the multi-user display comprises a multi-user grid display that displays heart rate information associated with a plurality of participants in an exercise session.

11. The advertising content service provider system (ACSPS) that provides advertising content using the group training system (GTS) defined by claim 8, wherein the entity associated with the first GTS comprises at least one of a business entity, at least one person, an association, a lessee of the first GTS, and an owner of the first GTS.

12. The advertising content service provider system (ACSPS) that provides advertising content using the group training system (GTS) defined by claim 8, wherein the processing device provides a report to the AS, the report comprising at least one of:
- an invoice requesting the payment from the AS as compensation for the first advertising content being displayed on the multi-user display associated with the first GTS;
- an identification of the first advertising content displayed on the multi-user display associated with the first GTS;
- a duration of time that the first advertising content was displayed on the multi-user display associated with the first GTS; and
- search word information.

13. The advertising content service provider system (ACSPS) that provides advertising content using the group training system (GTS) defined by claim 8, wherein the processing device provides a report to the entity associated with the first GTS, the report comprising at least one of:
- an identification of the first advertising content displayed on the multi-user display associated with the first GTS;
- a duration of time that the first advertising content was displayed on the multi-user display associated with the first GTS; and
- an amount to be paid to the entity associated with the first GTS as compensation for displaying the first advertising content on the first multi-user display associated with the first GTS.

14. The advertising content service provider system (ACSPS) that provides advertising content using the group training system (GTS) defined by claim 8, wherein the processing device transfers second advertising content from the entity associated with the first GTS for display on a multi-user display associated with a second GTS, payment being transferred by the processing device from the entity associated with the first GTS as compensation for the second advertising content being displayed on the multi-user display associated with the second GTS, payment being transferred by the processing device to an entity associated with the second GTS as compensation for the second advertising content being displayed on the multi-user display associated with the second GTS.

15. A non-transitory computer-readable storage medium comprising instructions encoded thereon that, when executed by a processing device, cause the processing device to provide advertising content using a group training system (GTS) by:
- transferring first advertising content to a first GTS by an advertising content service provider system (ACSPS), the first advertising content being provided by an advertiser system (AS);
- transferring payment from the AS by the ACSPS as compensation for the first advertising content being displayed on a multi-user display that displays in a grid-like format on the multi-user display that displays, real-time training-related information associated with each of a plurality of identified participants in a live cardiovascular group training session to the plurality of identified participants, thereby enabling comparison of the real-time training-related information by the plurality of identified participants during and after the live cardiovascular group training session, the multi-user display being associated with the first GTS;
- analyzing, using the processing device, the real-time training-related information associated with each of the plurality of identified participants in the live cardiovascular group training session, and generating a recommendation banner to the multi-user display for one or more identified participants in the live cardiovascular group training session; and
- transferring payment from the ACSPS to an entity associated with the first GTS as compensation for the first advertising content being displayed as an advertisement banner on the multi-user display associated with the first GTS.

16. The non-transitory computer-readable storage medium defined by claim 15, wherein the instructions causing the processing device to transfer payment to the entity associated with the first GTS include instructions that, when executed by the processing device, cause the processing device to transfer a portion of the payment transferred from the AS to the entity associated with the first GTS.

17. The non-transitory computer-readable storage medium defined by claim 15, wherein the multi-user display comprises a multi-user grid display that displays heart rate information associated with a plurality of participants in an exercise session.

18. The non-transitory computer-readable storage medium defined by claim 15, wherein the entity associated with the first GTS comprises at least one of a business entity, at least one person, an association, a lessee of the first GTS, and an owner of the first GTS.

19. The non-transitory computer-readable storage medium defined by claim 15, further storing instructions that, when executed by the processing device, cause the processing device to provide advertising content using the group training system (GTS) by providing a report from the ACSPS to the AS, the report comprising at least one of:
- an invoice requesting the payment from the AS as compensation for the first advertising content being displayed on the multi-user display associated with the first GTS;
- an identification of the first advertising content displayed on the multi-user display associated with the first GTS;
- a duration of time that the first advertising content was displayed on the multi-user display associated with the first GTS; and
- search word information.

20. The non-transitory computer-readable storage medium defined by claim 15, further storing instructions that, when executed by the processing device, cause the processing device to provide advertising content using the group training system (GTS) by providing a report from the ACSPS to the entity associated with the first GTS, the report comprising at least one of:
- an identification of the first advertising content displayed on the multi-user display associated with the first GTS;
- a duration of time that the first advertising content was displayed on the multi-user display associated with the first GTS; and
- an amount to be paid to the entity associated with the first GTS as compensation for displaying the first advertising content on the first multi-user display associated with the first GTS.

21. The non-transitory computer-readable storage medium defined by claim 15, further storing instructions that, when executed by the processing device, cause the processing device to provide advertising content using the group training system (GTS) by:
- transferring second advertising content to a second GTS by the ACSPS, the second advertising content being provided by the entity associated with the first GTS;
- transferring payment from the entity associated with the first GTS by the ACSPS as compensation for the second advertising content being displayed on the multi-user display associated with the second GTS; and
- transferring payment from the ACSPS to an entity associated with the second GTS as compensation for the second advertising content being displayed on the multi-user display associated with the second GTS.

* * * * *